United States Patent [19]

Kurtz

[11] 4,003,944

[45] Jan. 18, 1977

[54] PREPARATION OF 2,4-DICYANO-3,5-DIMETHYLANILINE
[75] Inventor: Peter Kurtz, Tegernsee, Germany
[73] Assignee: Bayer Aktiengesellschaft, Leverkusen, Germany
[22] Filed: May 25, 1972
[21] Appl. No.: 256,845
[30] Foreign Application Priority Data
May 25, 1971 Germany .......................... 2125907
[52] U.S. Cl. ........................ 260/465 E; 260/165; 260/205; 260/464
[51] Int. Cl.² ........................................ C07C 121/78
[58] Field of Search ............................... 260/465 E
[56] References Cited

FOREIGN PATENTS OR APPLICATIONS 958,922  2/1957  Germany

OTHER PUBLICATIONS

Bruckenberg: Chemical Abstracts, Vol. 51, pp. 10067–10068 (1957).

Primary Examiner—Lewis Gotts
Assistant Examiner—Dolph H. Torrence
Attorney, Agent, or Firm—Plumley and Tyner

[57] ABSTRACT

The novel compound 2,4-dicyano-3,5-dimethylaniline is prepared by heating a cyclic compound having the formula

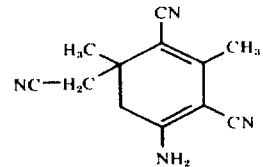

and splitting off acetonitrile. The 2,4-dicyano-3,5-dimethylaniline is collected e.g. by sublimation apparatus and is useful as an intermediate in the preparation of dyestuffs e.g. by diazotization and coupling with known coupling components.

3 Claims, No Drawings

PREPARATION OF 2,4-DICYANO-3,5-DIMETHYLANILINE

The subject of the present invention is a new aniline derivative of the formula

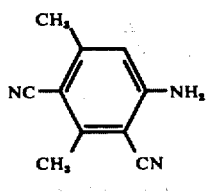

as well as a process for its preparation.

This process is characterized in that the dimerization product of 3-methyleneglutaric acid dinitrile of 3-methyl-glutaconic acid dinitrile of the formula $C_{12}H_{12}N_4$, obtained by warming a solution of these dinitriles in an inert solvent according to German Patent Specification No. 958,922, is thermally decomposed.

It must be described as distinctly surprising that this complicated amine which presumably cannot be prepared conventionally, is obtained in almost quantitative yield in this simple manner.

A preferred process for the manufacture of 2,4-dicyano-3,5-dimethylaniline is characterised in that the abovementioned compound of the formula $c_{12}H_{12}N_4$, which according to more recent spectroscopic investigation results does not have the straight-chain structure proposed in the cited German Patent Specification but has the following cyclic structure

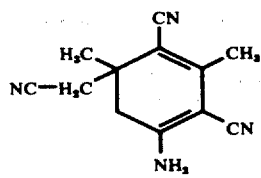

is warmed in a sublimation apparatus, in a vacuum of 0.01 to 50 mm Hg, at temperatures of 150° – 250° C, whereupon the new aniline deposits as crystals in the cold areas of the sublimator, whilst the acetonitrile which splits off during this decomposition reaction condenses in a subsequent low temperature cooling trap.

2,4-Dicyano-3,5-dimethylaniline is a valuable intermediate product for the manufacture of azo dyestuffs.

German Patent No. 958,922 discloses a method for preparing the dimerization product of 3-methylene-glutaric acid dinitrile or 3-methyl-glutaconic acid dinitrile comprising dissolving the dinitrile in an inert solvent with an alkaline reagent and heating at an elevated temperature for at least half an hour.

Among the suitable solvents mentioned are ethyl alcohol and other polar solvents, such as acetonitrile, pyridine and mixtures of ethyl alcohol and water. As the alkaline reagents, alkali metals, alkali- and alkanine earth-metal hydroxides and carbonates, alkali cyanides, alkali alcoholates and phenolates, and sodiumamide are mentioned. Appropriate temperatures in the range of 80°–85° C are disclosed. The recrystallized product has a melting point of about 204° C–205° C.

ILLUSTRATIVE EXAMPLE OF PREPARATION OF STARTING MATERIAL

The dimerization of 3-methyleneglutaric acid dinitrile or 3-methyl-glutaconic acid dinitrile is illustrated in Example 1 of German Patent No. 958,922 which is conducted as follows.

Three grams of sodium was dissolved in 750 cc of ethyl alcohol. To this solution a solution of 300 grams of beta-methyl glutaconic acid dinitrile dissolved in 250 cc of ethyl alcohol was quickly dropped in. The resulting dark brown solution was heated to about 80° C. After about 30 minutes the solution became cloudy and after a few more minutes the first crystals settled. After the solution was cooled the crystals were separated from it. 251.7 grams of a compound which decomposes at about 200° to 201° C was obtained. After the mother liquor was concentrated another 21 grams of the same compound was obtained. The yield was 272.7 grams which is about 91% of theoretical.

This compound recrystallized from ethyl alcohol or acetic acid had a melting point between 204° and 205° C with decomposition.

$C_{12}H_{12}N_4$, Molecular weight 212.26. Calculated: C, 67.00%; H, 5.70%; N, 26.40%. Molecular weight 240, 219, 182; Average 214. Found: C, 67.95%; H, 5.95%; N, 26.32%, 26.32%.

EXAMPLE 1

10 g of the dimeric compound $C_{12}H_{12}N_4$ manufactured according to DBP 958,922 from 3-methyleneglutaric acid dinitrile or 3-methyl-glutaconic acid dinitrile are warmed in a sublimation apparatus at 150° – 250° C under 0.02 mm Hg. A low temperature cooling trap is inserted between the sublimator and the vacuum pump, and 0.9 g of a liquid, which is identified by its IR-spectrum as acetonitrile, condenses in this trap. The degree of purity determined by gas chromatography is 97.7%. The slightly yellowish crystals deposited on the cold parts of the sublimator are 1,3-dicyano-2,6-dimethyl-4-aminobenzene, melting point 210° – 210.5° C (from ethanol). The yield is 7.7 g = 95% of theory.

Analysis $C_{10}H_9N_3$ (171.2): Calculated: C, 70.15%; H, 5.30%; N, 24.55%. Found: C, 70.0%; H, 5.4%; N, 24.7%.

The IR spectrum shows several signals for the NH-valency vibration, with the centre at 3,350 cm$^{-1}$, and a strong band at 2,210 cm$^{-1}$ for the conjugated CN groups. The nuclear resonance spectrum has 2 signals for the methyl groups at 2.22 and 2.25 ppm and one signal for the proton on the benzene at 6.6 ppm.

EXAMPLE 2

2 g of the compound $C_{12}H_{12}N_4$ are slowly heated to 220° and kept at this temperature for one-half hour.

The 1,8 g which crystallize out after cooling are slightly brownish, crude 2,4-dicyano- 3,5-dimethyl-aniline of melting point 189° – 192° C.

Sublimation thereof yields a pure product which is identical with that described in the preceding example.

EXAMPLE 3

The diazonium salt solution obtained according to Example 4 is added, whilst stirring, to an ice-cold solution of 22 g N,N-β-dichloroethyl-aniline in diluted hydrochloric acid. After stirring for 1 or 2 hours, the reaction mixture is neutralised with sodiumbicarbonate and thereafter the resulting dyestuff of the formula

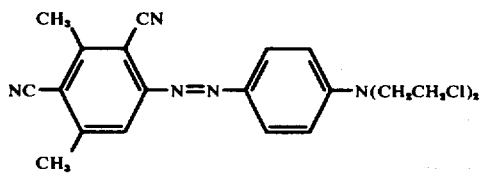

is filtered off, washed with water and dried. This dyestuff dyes polyester fibres in a red shade. The dyeings are characterized by good fastness properties.

EXAMPLE 4

17,1 g 2,4-dicyano-3,5-dimethylaniline are diazotized in 150 ml water and 35 ml concentrated HCl at a temperature of 0° up to 5° C with 6,9 g NaNO$_2$. The diazonium salt solution is added to an ice-cold solution of 22 g 1-ethyl-2-phenyl-indole in 150 ml dilute HCl. After stirring for 1 up to 2 hours, the reaction mixture is neutralized with sodiumbicarbonate and thereafter the resulting dyestuff of the formula

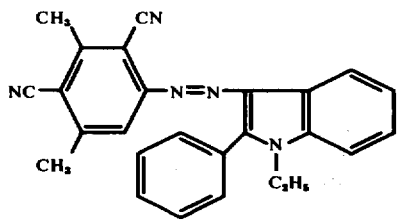

is filtered off. This dyestuff has been dyed according to the usual exhaustion process and yields on polyester fibres a yellowish-tinged red shade with good fastness properties. Further valuable dyestuff will be received if — instead of the abovementioned coupling component — the equivalent quantity of 1-cyanoethyl-2-phenylindole or 1-hydroxyethyl-2-methyl-indole is used.

What we claim is:

1. A process of the preparation of a compound of the formula

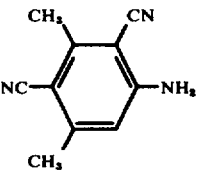

which comprises heating a starting compound having the empirical $C_{12}H_{12}N_4$ and a melting point of 204°–205° C, in a vacuum of 0.01 to 50 mm Hg and at a temperature of 150° to 250° C; said starting compound comprising the product which can be obtained by dimerizing 3-methylene-glutaric acid dinitrile or 3-methyl-glutaconic acid dinitrile by heating in an inert solvent.

2. A process which comprises thermally decomposing a compound of the formula

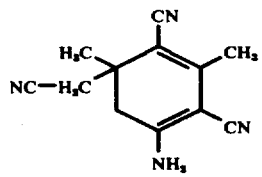

under conditions sufficient to form 2,4-dicyano-3,5-dimethylaniline and recovering said 2,4 dicyano-3,5-dimethylaniline.

3. The process of claim 2 in which thermal decomposition is accomplished in a vacuum of 0.01 to 50 mm Hg and at a temperature of 150° to 250° C.

* * * * *